United States Patent
Caraffi et al.

(10) Patent No.: US 10,528,127 B2
(45) Date of Patent: Jan. 7, 2020

(54) METHOD FOR OPERATING AN EYE TRACKING DEVICE AND EYE TRACKING DEVICE FOR PROVIDING AN ACTIVE POWER MANAGEMENT

(71) Applicant: APPLE INC., Cupertino, CA (US)

(72) Inventors: Claudio Caraffi, Berlin (DE); Matthias Nieser, Berlin (DE); Fabian Wanner, Berlin (DE); Walter Nistico, Berlin (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/034,895

(22) PCT Filed: Dec. 9, 2014

(86) PCT No.: PCT/EP2014/077078
§ 371 (c)(1),
(2) Date: May 6, 2016

(87) PCT Pub. No.: WO2015/086615
PCT Pub. Date: Jun. 18, 2015

(65) Prior Publication Data
US 2016/0274659 A1    Sep. 22, 2016

(30) Foreign Application Priority Data
Dec. 9, 2013   (EP) .................................... 13196282

(51) Int. Cl.
*G06F 3/01*     (2006.01)
*G06K 9/00*     (2006.01)
(Continued)

(52) U.S. Cl.
CPC .............. *G06F 3/013* (2013.01); *G06F 1/325* (2013.01); *G06F 1/3206* (2013.01);
(Continued)

(58) Field of Classification Search
CPC ........ G06F 3/013; G06F 1/3206; G06F 1/325; G06K 9/00604; H04N 5/2256; H04N 5/232; H04N 5/247
(Continued)

(56) References Cited

U.S. PATENT DOCUMENTS 8,483,450 B1 *   7/2013   Derakhshani ...... G06K 9/00597
                                                            382/115
2008/0199056 A1   8/2008   Tokuse
(Continued)

FOREIGN PATENT DOCUMENTS

CN    101336089 A    12/2008
CN    101808205 A    8/2010
(Continued)

OTHER PUBLICATIONS

Shinji Yamamoto et al., "Algorithm Optimizations for Low-Complexity Eye Tracking", Systems, Man and Cybernetics, 2009. SMC 2009. IEEE International Conference on, IEEE, Oct. 11, 2009, Piscataway, NJ, USA.
(Continued)

*Primary Examiner* — Joseph W Becker
(74) *Attorney, Agent, or Firm* — Fernando & Partners, LLP

(57) ABSTRACT

The invention relates to a method for operating an eye tracking device (10) comprising as components an imaging device (20), an illumination unit (30) and a processing unit (40) and further at least two adjustment parameters ($P_A$), for adjusting the components (20; 30; 40). The eye tracking device (10) comprises a control unit (42) for controlling the adjustment parameters ($P_A$). According to the method an image (60) of an eye is captured, a condition (44) with respect to a quality related to eye tracking or a power consumption of the components (20; 30; 40) is set, a
(Continued)

Figure 1:
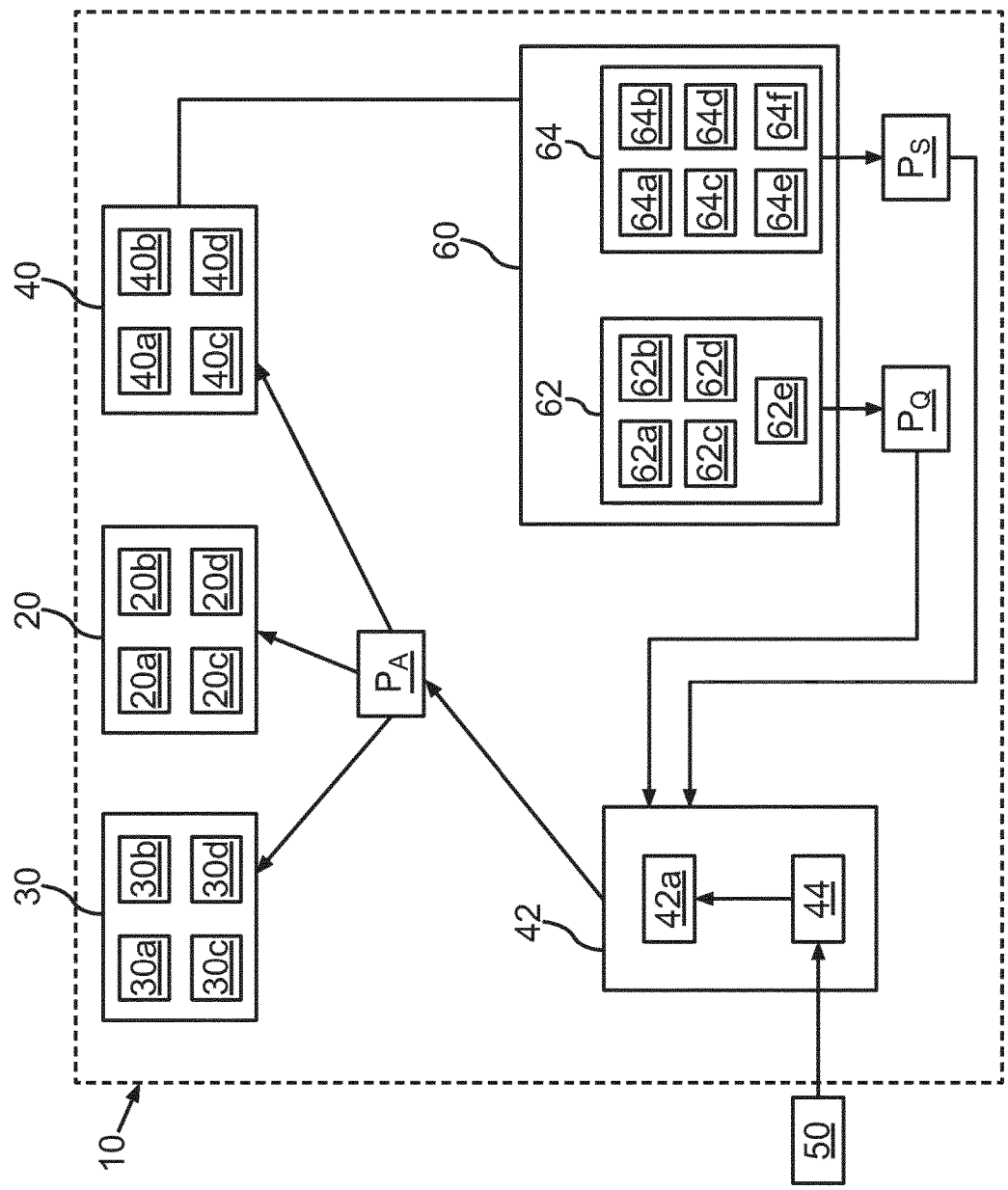

predefined correlation (42a) correlating the adjustment parameters ($P_A$) to the quality and the power consumption is provided and the control unit (42) controls the adjustment parameters ($P_A$) according to the predefined correlation (42a), so that the element, with respect to which the condition (44) was set, fulfils the condition (44).

20 Claims, 2 Drawing Sheets

(51) Int. Cl.
*G06F 1/3234* (2019.01)
*G06F 1/3206* (2019.01)
*H04N 5/225* (2006.01)
*H04N 5/232* (2006.01)
*H04N 5/247* (2006.01)

(52) U.S. Cl.
CPC ....... *G06K 9/00604* (2013.01); *H04N 5/2256* (2013.01); *H04N 5/232* (2013.01); *H04N 5/247* (2013.01)

(58) Field of Classification Search
USPC .......................................................... 348/78
See application file for complete search history.

(56) References Cited

U.S. PATENT DOCUMENTS

| | | |
|---|---|---|
| 2008/0294017 A1 | 11/2008 | Gobeyn et al. |
| 2010/0208081 A1 | 8/2010 | Tokutake |
| 2011/0109880 A1 | 5/2011 | Nummela |
| 2013/0106681 A1* | 5/2013 | Eskilsson ........... G06K 9/00597 345/156 |
| 2013/0278631 A1* | 10/2013 | Border ................. G02B 27/017 345/633 |
| 2014/0108842 A1* | 4/2014 | Frank ...................... G06F 17/28 713/323 |
| 2015/0103155 A1* | 4/2015 | Szapiel .................. G02B 23/14 348/78 |
| 2016/0227113 A1* | 8/2016 | Horesh .................. G03B 15/03 |

FOREIGN PATENT DOCUMENTS

| | | |
|---|---|---|
| EP | 2 587 341 A1 | 5/2013 |
| JP | 2002-537614 A | 11/2002 |
| JP | 2008-205650 A | 9/2008 |
| WO | 00/49577 A1 | 8/2000 |

OTHER PUBLICATIONS

International Search Report of PCT/EP2014/077078 dated Feb. 20, 2015 [PCT/ISA/210].
Written Opinion of PCT/EP2014/077078 dated Feb. 20, 2015 [PCT/ISA/237].
Communication dated Feb. 14, 2017 issued by the Japanese Patent Office in counterpart application No. 2017-000295.
Office Action for corresponding Chinese Application No. 201480066839.3 dated Aug. 6, 2018.

* cited by examiner

METHOD FOR OPERATING AN EYE TRACKING DEVICE AND EYE TRACKING DEVICE FOR PROVIDING AN ACTIVE POWER MANAGEMENT

CROSS REFERENCE TO RELATED APPLICATIONS

This application is a National Stage of International Application No. PCT/EP2014/077078, filed Dec. 9, 2014, claiming priority based on European Patent Application No. 13 196 282.1, filed Dec. 9, 2013, the contents of all of which are incorporated herein by reference in their entirety.

The invention relates to a method for operating an eye tracking device with a predetermined capturing area, wherein the eye tracking device comprises as components at least one imaging device capable of capturing images of at least one eye of a user and a capturing area of the eye tracking device, at least one illumination unit with at least one light source capable of illuminating the at least one eye of the user in the capturing area and a processing unit capable of processing images captured by the imaging device. Furthermore, the eye tracking device comprises at least two adjustment parameters, by means of which at least one of the components is adjustable, wherein the eye tracking device further comprises at least one control unit capable of controlling the at least one of the components by setting the at least two adjustment parameters. Moreover, at least one image of the at least one eye of the user is captured. The invention further relates to an eye tracking device.

This invention applies in the context of an eye tracking device, which is an apparatus to detect and track the position, orientation or other properties of the eyes of a user, like pupil dilation, intra-ocular distance, etc.

With eye tracking devices becoming a more and more established technology, and in parallel with an increasing availability of more and more portable devices, like tablets, smartphones, head-mounted displays, etc., in which eye tracking functions are integrated, it becomes relevant to make eye tracking devices low power consuming.

U.S. Pat. No. 7,980,698 B2 describes a power adjusted aberrometer that comprises a light source for illuminating an eye and a microlens array for directing light reflected by the eye onto a sensor. Thereby, the sensor detects multiple light spots that shall, at best, comprise light levels that fall in an acceptable range to be able to capture the relevant eye properties out of this image of light spots. To achieve this, the light intensity of the light source is automatically increased if the signal quality is too bad. Here, only achieving the best possible image quality is addressed but power consumption is not taken into account.

JP 2002 28 2209 describes a sight line detector with an illumination unit for illuminating a user's eye and a capturing unit for capturing images of the user's eye. Before an acquisition of the image information for performing the line of sight detection, several preliminary images of the eye are acquired, then the distance of the sight line detector to the eye is calculated and an illumination light quantity based on this distance is determined. Thereby, the light intensity for illuminating the user's eye can be adapted to the distance of the user for increasing the image quality. Here also the power consumption of the eye tracking device is not taken into account.

U.S. Pat. No. 8,025,405 B2 describes a eye tracking device for automatically registering and tracking a respective position of at least one eye of a subject. In order to provide a power efficient eye tracking device with a reduced power consumption of an illumination unit it is proposed that the position of the eyes is estimated and the illumination provided by the illumination unit is directed towards this estimated position, so that only the region, in which the eyes are expected to be, need to be illuminated and therefore illumination power can be saved. A disadvantage of this eye tracking device is, that a position of the eyes needs to be estimated, which is quite error-prone. If the estimated position does not fit the real position of the eyes no useful images can be acquired, which in turn has a very negative impact on the tracking quality. Furthermore, as this direction of the illumination towards the estimated eye position is implemented by large LED arrays or by movable mirrors and light sources, the eye tracking device is not very suitable for being integrated in mobile devices.

US 2013/0106681 A1 describes a method for power management in an eye tracking system that can be integrated in a personal computer system without burdening the energy performance of the computer system. For this purpose, an imaging device of the eye tracking system is switchable between at least an active mode, a ready mode and an idle mode, wherein in the active mode the eye tracking data includes eye position and eye orientation, whereas in the ready mode for power saving purposes the eye tracking data only includes the eye position but not the eye orientation. A great disadvantage of this method is that for power saving the range of functions offered by the eye tracking system must be reduced.

It is the object of the present invention to provide a method for operating an eye tracking device and an eye tracking device as indicated in the preambles of the independent claims by means of which the aspects of power consumption and tracking quality or function range can be brought into a line in a better way.

This object is solved by a method for operating an eye tracking device and an eye tracking device with the features of the independent claims.

According to a first aspect of the invention at least one first condition with respect to an element of a group of a quality related to the eye tracking and a power consumption of the at least one of the components, which are the imaging device, the illumination unit and the processing unit, is set. Furthermore, a predefined correlation correlating the at least two adjustment parameters by means of which at least one of the components is adjustable, to the quality and power consumption is provided and the control unit controls the at least two adjustment parameters according to the predefined correlation, so that the element, with respect to which the first condition was set, fulfils the first condition.

The invention has the great advantage that requirements of different situations can be taken into account. This is made possible by setting the at least one first condition with respect to either the quality or the power consumption. In that way, priorities can be set situation dependent. For example, in one situation it may be important to restrict the power consumption, whereas in another situation it may be important to achieve a high tracking quality. Thereby the invention harmonizes the discrepancy between quality and power consumption by providing the flexibility of adapting the operation of the eye tracking device to the requirements of different situations. Furthermore, this is made possible by providing a correlation which correlates the adjustment parameters to the quality and the power consumption. The invention is based on the finding that adjustments of the eye tracking device that have impact on the power consumption at the same time have impact on the tracking quality. The interplay between quality and power consumption in dependence of the adjustment parameters can thereby be taken into account by the predefined correlation, which therefore makes it possible to find an appropriate balance between quality and power consumption in adaption to different situations. Moreover, as at least two adjustment parameters are provided by means of which at least the one of the components is adjustable, there is provided a certain degree or freedom which allows for an optimization of either the quality or the power consumption while the other of these two elements fulfils the first condition. Especially, the invention is based on the finding that there can be a lot more than just two adjustments parameters be provided, which influence power consumption and quality, which are explained later in more detail, so that this plurality of adjustment parameters can be used to achieve a reduction in power consumption as well as an optimization in quality at the same time.

In an advantageous embodiment of the invention the first condition consists in a predetermined minimum quality value that the quality has to exceed if the first condition was set with respect to the quality related to the eye tracking. It is also possible that there are multiple predetermined minimum quality values, for example, that can be set by a user or that can be set in dependence of the requirement of a specific application or the like. Advantageously, if the first condition is set with respect to the quality, it can be made sure that a certain minimum quality is achieved, while e.g. the power consumption is reduced.

Furthermore, the first condition can also consist in a predetermined minimum quality value and a predetermined maximum quality value, so that the quality has to be between a minimum quality value and the maximum quality value if the first condition is set with respect to the quality related to the eye tracking. This embodiment of the invention is especially advantageous, because on the one hand it is made sure that a certain minimum quality is achieved and on the other hand by setting a maximum quality value, also the power consumption is restricted at the same time, as by a rule of thumb the higher the tracking quality, the higher the power consumption.

In another embodiment, if the first condition was set with respect to the power consumption, the first condition preferably consists in a predetermined maximum consumption value that the power consumption has to fall below. So advantageously, the power consumption can be restricted. Here also a plurality of different maximum consumption values can be provided, which then can be chosen according to the requirement of a specific situation. For example, a user may input a restriction value for the power consumption or a power saving mode of the eye tracking device or this maximum power consumption value can be set according to the power availability of the eye tracking device or the system the eye tracking device is integrated in.

According to a further embodiment of the invention, if the first condition was set with respect to the power consumption, the first condition consists in a predetermined maximum consumption value and a predetermined minimum consumption value so that the power consumption lies between the maximum consumption value and the minimum consumption value. As already mentioned, the power consumption is linked to the tracking quality, so by providing a maximum consumption value as well as a minimum consumption value the power consumption can be restricted and at the same time it can be ensured that by restricting the power consumption the quality is effected not more than necessary.

By introducing these different levels of flexibility to achieve power saving, it is make possible to achieve either the best possible quality given a power saving constraint or the minimum power saving given a quality constraint. As further the quality constraint or the power consumption constraint might be received in input, the operation of the eye tracking device can be adapted to different situations in the most efficient manner.

To decide, to which element of the group the condition is set, the eye tracking device preferably receives an input signal that specifies the element, and eventually also the condition itself, and the eye tracking device then sets the condition with regard to the element on the basis of the received input signal.

Furthermore, to achieve an optimization, it is an preferred embodiment of the invention that, if a plurality of combinations of values of each adjustment parameter leads to the element, with respect to which the first condition was set, fulfilling the first condition, the control unit controls the at least two adjustment parameters according to the predefined correlation so that a first combination of the plurality of combination is set, so that a value of the element of the group, with respect to which the first condition was not set, is extremized in comparison to other combinations of the plurality of combinations. If for example, the first condition was set with respect to the quality the adjustment parameters are controlled such, that the quality fulfils the condition and at the same time the power consumption is reduced as far as possible. On the other hand, if the condition was set with respect to the power consumption the adjustment parameters are controlled such that the power consumption fulfils the condition and at the same time the quality is increased as far as possible. This is made possible by the at least two adjustment parameters, especially by plenty of adjustment parameters, which provide the necessary degrees of freedom for this optimization. In other words, there are different possible combinations of how these adjustment parameters can be set to achieve for example the required minimum quality. So, this combination of parameters is chosen for which the lowest power consumption can be reached. Also there are different possibilities of setting the adjustment parameters so that the power consumption falls below a predetermined value. So this combination of adjustment parameter values can be set for which the quality is maximum. In this way, advantageously, the restrictions a user has to take for saving power are reduced to a minimum.

To be able to provide this optimization it is useful to know which adjustment parameters influence the power consumption and the quality and in what way. For example, the eye tracking device can operated at a fixed or a variable frequency. The imaging device alternates periods in which its shutter is open, which is called the exposure time window, allowing for the collection of light from the environment, and periods in which its shutter is closed. For example, if the eye tracking device is set to perform at 50 Hz and exposure time window is set to 3 ms, during one second the imaging device will alternate 50 periods of 3 ms in which its shutter is open and 50 periods of 17 ms in which its shutter is closed. The illumination unit may be permanently on, or may emit pulsed illumination synchronized with the imaging device exposure time window and with a pulse of a same or different duration of the exposure time window of the imaging device. In case of more than one imaging device or illumination unit, all of them operate a synchronized in this set up. The illumination unit may control both the pulse duration (pulse length) and the pulse amplitude (pulse intensity). The product of these two values, especially the integral over the time of the pulse intensity, is directly related to the amount of light emitted and of power consumed by the illumination unit by each pulse. If the imaging device presents a rolling shutter, further considerations about synchronization and time windows are necessary.

Therefore, the energy consumption of the illumination sources depends on the power curve shape. At the same time, as a general rule, the more light the imaging device is able to collect, the better will be the tracking quality. Although the power consumed by the illumination unit is prominent, also the other components of the components of the eye tracking device consume energy. The processing unit does normally perform other tasks beside eye tracking, however, its power consumption increases because of the additional computation required by the eye tracking algorithm. So for example, choosing to use a simplified algorithm might reduce the consumption of the processing unit. Furthermore, the imaging device can comprise more than just one camera, for example two cameras, one for visible light and one for infrared light, so also the number of cameras influences the power consumption as well as the tracking quality.

Therefore, it is a very advantageous embodiment of the invention when the at least two adjustment parameters refer to a light intensity of the illumination unit, especially to a light intensity of at least one light source of the illumination unit, with which the at least one light source illuminates the eye while capturing an image, and/or an illumination duration during capturing an image and/or an illumination frequency and/or a number of active light sources of the illumination unit and/or an adjustment parameter for selecting an eye tracking algorithm out of at least different eye tracking algorithms for determining at least one property of the at least one eye and/or an adjustment parameter for selecting at least one camera out of at least two different cameras of an imaging device for capturing the image and/or an electric gain of the capturing unit and/or an update frequency and/or an aperture size of an aperture of the capturing unit and/or an adjustment of a shutter of the imaging device and/or a sampling rate of the imaging device and/or a clock frequency of the processing unit and/or a number of computational units of the processing unit being in an active state. All these adjustment parameters have influence on the power consumption as well as on the quality.

Consequently and advantageously, there are many possibilities of adapting the power consumption and quality situation specifically.

To account for different situations, it is very advantageous to characterize different situations. Therefore, it is preferred that at least one situation parameter characterizing at least one of environmental light intensity, user behaviour, user characteristic, especially eye colour and/or skin colour, is determined, wherein the predefined correlation is predefined at least by the at least one situation parameter. In other words, the control unit can control the adjustment parameters in dependence of the at least one determined situation parameter. For example, if much light is present in the environment, the light intensity of the illumination unit or the illumination duration can be reduced to achieve the same quality in comparison to the case where only little light is present in the environment. Also the user behaviour is relevant for the settings of the adjustment parameters. If for example, movement happens during the exposure time window, the captured image will present undesirable motion blur. This motion blur is proportional to the movement speed and to the time window duration. The movement might concern both the user and its eye and the device itself. So if the movement speed is high, the exposure time window must not be too long to achieve an acceptable quality. If the movement speed is low, there are more degrees of freedom for setting the adjustment parameters, for example, the exposure time window can be set long and a small light intensity can be chosen for being emitted during the exposure time window, or the exposure time window can be set shorter and the light intensity of the illumination unit can be set higher correspondingly. The user behaviour also influences the requirement of the frequency of the update rate of the eye tracking device. For example, if there is no strong movement of the eyes a good quality can be achieved with even quite small update rates whereas if there is strong eye movement the update rates need to be higher to achieve the same quality. Also the eye colour of the user and/or its skin colour have influence on the quality and therefore on the corresponding settings of the adjustment parameters. For example, brown eye people present a higher contrast between pupil and iris in the infrared domain, as opposed to the visible domain. The information about the eye colour can be used to decide whether a camera for visible or infrared light or even both should be used for allowing the best eye feature extraction. Also other user characteristics like whether the user wears spectacles or not, influences the quality, as eye features are more difficult to extract from an image, if a user wears spectacles. So for example, if the user is not wearing spectacles or glasses the eye tracking device can reduce the amount of light emitted to obtain the desired minimum quality. Furthermore, the colour of skin can be used for detecting the face or the eyes of a user and the colour appearance can be optimized by adjusting the lighting conditions. So if at least one of the above named situation parameters is determined this allows for an even much better adaption to different situation and especially for an optimization of quality as well as a reduction of power consumption as far as possible.

Advantageously, these situation parameters can be derived from one or more captured images, in particular by captured images the environmental light situation can be specified as well as the eye colour of the user or the skin colour or other user characteristics and also the user behaviour like the extend of movement of the user or its eyes can be captured. So preferably the processing unit analyzes the captured image and the control unit controls the adjustment parameters in dependence of the analysis results.

In a further embodiment of the invention the quality related to the eye tracking is derived from the at least one image captured by the capturing unit by analyzing the at least one image by the processing unit. So if the condition is set with respect to the quality by deriving the quality from the image it can be checked whether the quality fulfils the condition. If this is not the case the adjustment parameters can be controlled such that the quality finally fulfils the condition, e.g. in a closed loop control.

The quality related to the eye tracking can be an image quality or an estimated eye tracking quality. The image quality can directly be derived from captured image, wherein furthermore the image quality is linked to the eye tracking quality, so that out of a determined image quality also the eye tracking quality can be estimated.

The image quality can be determined by at least one quality feature extracted out of the at least one image, especially a contrast in the at least one image, in particular between detected eye portions of the eye of the user, and/or a signal to noise ratio of the image and/or a size of a detected reflection in the at least one image and/or a saturation of a detected reflection in the at least one image and/or a brightness of a detected reflection in the at least one image. In order to perform eye tracking certain eye portions, like the iris or the pupil have to be identified in the image as well as reflections reflected by the eye, in particular glints. So, if the contrast between eye portions like the pupil and the iris or the iris and the sclera is high, these portions can identified much better. Furthermore, if the signal to noise ratio is high, this also enhances identifying the relevant eye portions as well as the relevant reflections. Also the size of the relevant reflections and the brightness of the relevant reflections have influence on the eye tracking quality and therefore a relevant quality features characterizing the image quality. So if these features are extracted out of the captured image the image quality can be determined. Also these extracted quality features can be taken into account by the predetermined correlation for determining the adjustment parameters values that have to be set or achieve a certain image quality.

As this image quality is also related to the eye tracking quality it is a very advantageous embodiment of the invention when the eye tracking quality is derived from the image quality as an estimated eye tracking quality, in particular by the steps:
  Processing the image, thereby extracting at least one quality feature out of the image;
  Providing a predefined correlation that correlates the at least one quality feature to an image quality and an image quality to an estimated tracking quality; and
  Determining the estimated tracking quality by assigning the at least one extracted image feature to the image quality and the estimated tracking quality according to the predefined correlation, wherein the estimated tracking quality is a measure for a deviation of a determined property of the eye from an actual property of the eye.

Thereby the tracking quality can be a tracking accuracy, which is a measure for how closely the reconstructed property of the eye, e.g. the reconstructed gaze, matches the real property of the eye, e.g. the real observation direction of the user.

The tracking quality can also be a tracking precision, which is a measure for the repeatability, namely a measure for how consistent the output result is, given the same or similar input condition, or again how much noise is present in the output for a constant input.

As the quality of the reconstructed eye and gaze is strongly related to the quality of the acquired eye image, the image quality can be mapped to an expected eye tracking quality. Once this map is defined the eye tracking can compute an eye tracking quality while doing eye tracking. The map "image quality to eye tracking quality" could for example be recorded and stored once when calibrating the device. For example, a user can be asked to fixate a number of points on a screen linked to the eye tracking device, whose positions are known to the eye tracking device. Over some seconds, the system adjusts different camera and light source properties, like gain value, light intensity, shutter speed, and so on. It analyzes the quality of the captured images, reconstructs the eyes and/or the gaze direction and computes e.g. a point of regard on the screen and measures the error in accuracy or precision of the reconstruction. So, these values can be saved into a data structure, which then defines a correlation between image quality and eye tracking quality.

If for example a desired eye tracking quality is required, e.g. by setting a corresponding condition, then this generated map, which relates image quality to eye tracking quality, can be used to translate the desired eye tracking quality into a desired image quality and while doing eye tracking, the eye tracking device can adjust the adjustment parameters to achieve the given image quality, which can be derived from each captured image as already explained. Furthermore, it's also possible to provide an estimated eye tracking quality for different regions of the 3D environment or on the device screen. For example, gaze results can be estimated to be better for the center region of a screen and lower for its peripheral part. This information about gaze quality may be used by an application to adapt the way it interfaces with a user, e.g. by presenting on the screen bigger or smaller or more or less spaced choice areas like buttons, or presenting these choice areas in regions of the screen where the system estimates the gaze output will be better.

Therefore it is a very advantageous embodiment of the invention that the estimated eye tracking quality is calculated in function of 3D coordinates of a volume or surface lying in a field of view of the user, in particular in function of 3D world coordinates, or in function of 2D coordinates of a surface lying in a field of view of the user, in particular in function of 2D coordinates of a display device connected to the eye tracking device. Thereby it is possible to calculate the estimated tracking quality for different regions of a user's field of view, e.g. for different regions of a display in the users field of view. The display device is preferably part of a device, like a computer, a tablet, a mobile device, a head mounted display, etc, the eye tracking device is part of, integrated in or at least connected to, so that a relative position between the imaging device of the eye tracking device and the display of the device is known to the eye tracking device. Furthermore, the position of the user relative to the imaging device can be determined by capturing an image, so that the estimated eye tracking quality can be determined for several, different regions in the user's field of view, wherein in particular the number of different regions can be presetable by the eye tracking device. So for example different quality values of the estimated eye tracking quality can be attributed to different regions of a computer screen or other surfaces, including also virtual or hypothetical surfaces.

Moreover, the estimated tracking quality in function of the above named coordinates can be provided as an output signal of the eye tracking device, so e.g. this output signal can be provided to an application running on the device connected to the eye tracking and this signal can be used by the application to adapt the way it interfaces with a user as explained above.

Also in general the quality related to the eye tracking, i.e. the image quality and/or the tracking quality, can be calculated by the eye tracking device and outputted or be provided as an output signal at an output of the eye tracking device, e.g. for further use by an application or an other device.

According to another embodiment of the invention the predefined correlation that correlates the adaption parameters to the quality and the power consumption is predefined at least by requirements of an external application communicated to the eye tracking device. This is based on the finding that the kind an application is of also contains information about what kind of eye movement of the user will be expected. For example, if the user is looking at an image or video, less eye movement is expected than if the user plays a 3D shooter game. So the kind of application can also be taken into account in the correlation for adjusting the adjustment parameters as another situation parameter that can be determined by the eye tracking device.

The predefined correlation may be given by an assignment of a plurality of sets of combinations of settable values of the at least two adjustment parameters to a quality value of the quality and a power consumption value of the power consumption, especially in form of look-up table and/or a characteristic curve family or is given by a mathematical formula and/or a mathematical model and/or a function correlating the at least two adjustment parameters and the power consumption and the quality. For example, for each of the different situations or combinations of situation parameters that can be captured a corresponding look-up table or characteristic curve can be set by the control unit, wherein the look-up table or characteristic curve then defines how the adjustment parameters have to be set for that specific situation, so that one element, either the quality or the power consumption, fulfils the predetermined condition, and the other element can optionally be optimized. The situation parameters can also be input parameters for the above named formula, model or function, so that on the basis of the predefined correlation the control unit sets the adjustment parameters depending on the situation specified by the situation parameters.

Furthermore the control unit can control the at least two adjustment parameters according to the predefined correlation in an open loop control or also in a closed loop control. So for example, if the condition was set with respect to the quality the current quality like the image quality, can be determined out of a current image and fed back to the correlation which provides a regulation strategy to achieve that the quality fulfils the condition. It would also be possible, as open loop control, to determine the situation parameters out of a current image, or also each currently captured image, and set the adjustment parameters according to the look-up table of characteristic curve for that situation parameters.

Furthermore, the at least one first condition can be set according to a user input or by a given external application or by a given power supply mode. For example, a user can input whether he wants to restrict the power consumption or the quality and/or to what extend. Also different applications have different requirements concerning the tracking quality. So also the required tracking quality can be communicated from an application to the eye tracking device, wherein the eye tracking device then sets the respective condition with regard to the quality, e.g. a minimum value. Furthermore, the eye tracking device might also be able to determine a power supply mode, namely whether the eye tracking device is plugged in or powered by battery. So if the eye tracking device is plugged in power consumption becomes less relevant and the condition for the quality can be set to maximum. If the eye tracking device is powered by battery, the eye tracking device automatically can set a condition with respect to the power consumption.

The eye tracking device according to the first aspect of the invention comprises a predetermined capturing area and as components at least one imaging device capable of capturing images of at least one eye of a user in the capturing area, at least one illumination unit with at least one light source capable of illuminating the at least one eye of the user in the capturing area and a processing unit capable of processing images captured by the imaging device. Furthermore, the eye tracking device comprises at least two adjustment parameters, by means of which at least one of the components is adjustable, wherein the eye tracking device further comprises at least one control unit capable of controlling the at least one of the component by setting the at least two adjustment parameters. The control unit is capable of setting at least one first condition with respect to an element of the group of a quality related to eye tracking and a power consumption of the at least one of the components. Moreover, the eye tracking device comprises a predefined correlation correlating the at least two adjustment parameters to the quality and the power consumption. In addition, the control unit is capable of controlling the at least two adjustment parameters according to the predefined correlation, so that the element, with respect to which the at least one first condition was set, fulfils the at least one first condition.

The preferred embodiments and advantages thereof described with regard to the method for operating an eye tracking device according to the first aspect of the invention correspondingly apply to the eye tracking device according to the first aspect of the invention. In particular, the described steps of the method for operating an eye tracking device and its embodiments according to the first aspect of the invention constitute further embodiments of the eye tracking device according to the first aspects of the invention.

According to a second aspect of the present invention the method for operating an eye tracking device for capturing at least one property of at least one eye of a user in a capturing area of the eye tracking device, wherein the eye tracking device comprises as components at least one imaging device capable of capturing images of the at least one eye of the user, at least one illumination unit with at least one light source capable of illuminating the at least one eye of the user, and a processing unit capable of processing images captured by the imaging device, comprises the steps:
a) capturing an image of the eye of the user;
b) processing the image, thereby extracting at least one quality feature out of the image;
c) providing a predefined correlation that correlates the at least one quality feature to an image quality and the image quality to an estimated tracking quality; and
d) determining the estimated tracking quality by assigning the at least one extracted quality feature to the image quality and to the estimated tracking quality according to the predefined correlation, wherein the estimated tracking quality is a measure for a deviation of the determined property of the eye from an actual property of the eye.

As already described with regard to embodiments according to the first aspect of the invention the method according to the second aspect of the invention has the great advantage that, based on the finding that the quality of the reconstructed eye and gaze is strongly related to the quality of the acquired eye image, the image quality can be mapped to an expected eye tracking quality, where in particular this map is given by the predefined correlation. If for example a desired eye tracking quality is required, e.g. by setting a corresponding condition, then this correlation, which relates image quality to eye tracking quality, can be used to translate the desired eye tracking quality into a desired image quality and while doing eye tracking, the eye tracking device can adjust the adjustment parameters to achieve the given image quality, which can be derived from each captured image as already explained. Furthermore, it's also possible to provide an estimated eye tracking quality for different regions of the 3D environment or on the device screen. For example, gaze results can be estimated to be better for the center region of a screen and lower for its peripheral part. This information about gaze quality may be used by an application to adapt the way it interfaces with a user, e.g. by presenting on the screen bigger or smaller or more or less spaced choice areas like buttons, or presenting these choice areas in regions of the screen where the system estimates the gaze output will be better. So, knowing the eye tracking quality or being able to estimate the eye tracking quality is especially relevant for power saving purpose, as in this case the eye tracking quality shell be restricted or shell fulfil some condition or some minimum eye tracking quality shell be guaranteed though power saving. Therefore this method according to the second aspect of the invention, which is facilitating to estimate the eye tracking quality on the basis of the image quality of the captured images, is especially advantageous with regard to power saving aspects, too.

The eye tracking device according to the second aspect of the invention for capturing at least one property of at least one eye of a user in a capturing area of the eye tracking device comprises as components at least one imaging device capable of capturing images of the at least one eye of the user, at least one illumination unit with at least one light source capable of illuminating the at least one eye of the user and a processing unit capable of processing images captured by the imaging device. Furthermore, the processing unit is capable of processing an image captured by the imaging device and thereby extracting at least one quality feature out of the image. The eye tracking device comprises a predefined correlation that correlates the at least one quality feature to an image quality and the image quality to an estimated tracking quality and the processing unit is further capable of determining the estimated tracking quality by assigning the at least one extracted quality feature to the image quality and to the estimated tracking quality according to the predefined correlation, wherein the estimated tracking quality is a measure for a deviation of the determined property of the eye from an actual property of the eye.

The preferred embodiments and features of the method for operating an eye tracking device and of the eye tracking device according to the first aspect of the invention can also be combined with the method for operating an eye tracking device and the eye tracking device according to the second aspect of the invention. The preferred embodiments and advantages thereof described with regard to the method for operating an eye tracking device and the eye tracking device according to the first aspect of the invention correspondingly apply to the method for operating an eye tracking device and the eye tracking device according to the second aspect of the invention. In particular, the described steps of the method for operating an eye tracking device and its embodiments according to the first aspect of the invention constitute further embodiments as well of the method for operating an eye tracking device according to the second aspect of the invention as of the eye tracking device according to the second aspect of the invention.

In the following, advantageous embodiments of the present invention are described in more detail with difference to the accompanying drawings.

Figure 2:
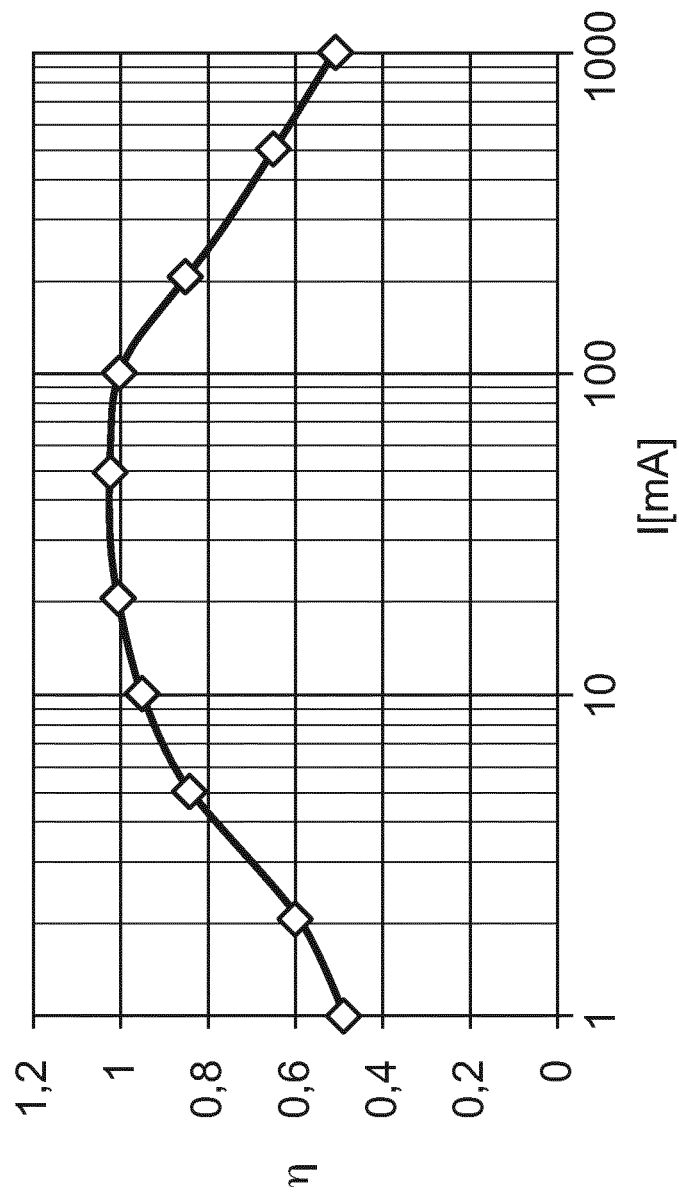

They show in:

FIG. 1 a schematic illustration of the components of an eye tracking device to visualize the method for operating an eye tracking device according to an embodiment of the invention; and FIG. 2 a graphical representation of a typical efficiency chart for an infrared LED.

FIG. 1 shows a schematic illustration of an eye tracking device 10 and its components. The eye tracking device 10 comprises as components an imaging device 20, which has at least one camera, either an infrared camera or a camera for visible light or both, for capturing images of the eyes of a user in a capturing area of the eye tracking device 10. Furthermore it comprises an illumination unit 30, which has at least one light source, in particular two or more LEDs, which are preferably placed near by the camera or the cameras. Furthermore, it comprises as further component a processing unit 40, which can be provided for example by a PC, a Laptop, mobile device, etc.

The processing unit 40 processes the images from the camera and detects the eyes of the user, usually the contours or center points of the pupil and/or iris. It also preferably detects the reflections (glints) of the light sources on the cornea of the eyes. The detected features can then be used to compute a 3D position and/or orientation of the user's eye, the corresponding gaze directions and/or the point of regard, or other properties of the eye.

Furthermore, the components of the eye tracking device 10 comprise different adjustment parameters $P_A$, by means of which the components and their operation is adjustable and which influence the power consumption of the eye tracking device 10 as well as the eye tracking quality. These adjustment parameters $P_A$ are explained in the following.

The imaging device 20 comprises at least one camera which during operation of the eye tracking device 10 captures images of the eyes of the user with a certain frequency. Therefore, the camera comprises a shutter which opens for capturing an image, and is closed for the time between capturing images. During the operation of the imaging device 20, the illumination unit 30 can permanently emit light, but it is more efficient with regard to the power consumption if the illumination unit 30 operates with pulsed illumination, so that the illumination provided by the illumination unit 30 is synchronized with the shutter of the camera.

For such a setup the illumination unit 30 can be adjusted in its illumination intensity 30a. Thereby, optionally each illumination source of the illumination unit 30 can be adjusted in its intensity 30a separately. Furthermore, the illumination frequency 30b, in synchronization with the shutter frequency, can be adjusted as well, also the illumination duration 30c, again preferably in synchronization with the exposure time window of the shutter, as well as the number of light sources 30d being active for capturing an image.

The imaging device 20 can be adjusted with regard to its shutter parameters 20a, namely the shutter frequency and exposure time window, as already explained, the electric gain 20b, which determines the sensitivity of the camera sensor, can be adjusted, the number of cameras 20c for capturing images as well as the aperture size 20d of the respective cameras.

The processing unit 40 can be adjusted with regard to the algorithm 40a used for eye tracking, in its clock frequency 40b, in the number of computational units activated 40c, and whether sample retractions 40d are allowed or not.

Furthermore, the eye tracking device 10 comprises a control unit 42 for controlling the above named adjustment parameters $P_A$. The control unit 42 is shown in FIG. 1 separately, but the control unit 42 needs not to be a separate entity but can also be a part of the processing unit 40.

For operation of the eye tracking device 10 first of all a condition 44 is set with regard to either the power consumption or a quality related to eye tracking. This condition 44 can be set in dependence of external inputs 50. For example, a user can input a desired condition, like a desired minimum tracking quality or a desired power restriction. Also an external application running on a system and to which the eye tracking device 10 is integrated and the eye tracking is used for can communicate such a condition 44, like the requirement for a minimum tracking quality, to the eye tracking device 10. Furthermore, the eye tracking device 10 can also check whether it's connected to an electricity grid or supplied by battery. If it's supplied by battery automatically a constraint with regard to the power consumption can be set, maybe also in dependence of the charge state of the battery. If the eye tracking device 10 detects that it is power supplied by the electricity grid the condition 44 for the quality can be set to a maximum. The condition 44 can also be set by a combination of the described external inputs 50, for example in a predetermined priority order, e.g. when the eye tracking device 10 is plugged in the condition for quality is set to maximum only if no other user input is received.

Furthermore, the imaging device 20 repeatedly captures images 60 during the operation for eye tracking. Such an image 60 contains information, which also can be used for adjusting the adjustment parameters $P_A$. First of all an image quality 62 can be derived from different image features which constitute image quality parameters $P_Q$, like the contrast 62a in the image, the glint size 62b, the saturation 62c, the signal to noise ratio 62d and the glint brightness 62e. This information can be extracted out of the image 60 by the processing unit 40 and be provided in the form of image quality parameters $P_Q$, in particular to the control unit 42.

Furthermore, the processing unit 40 can extract out of the captured image 60 also information about specific situations 64, for example the environmental light intensity 64a can be determined, the eye colour 64b of a user, the skin colour 64c of a user, the behaviour or movement 64d of the user and its eyes or other user characteristics, like whether the user wears spectacles 64e and the gazing angle 64f of the user relative to the imaging device 20, which can be used for determining an estimate of the output result quality for different regions of the 3D environment as described later. This information can then be provided in the form of situation parameters $P_S$. The extracted situation parameters $P_S$ as well as the image quality parameters $P_Q$ can be fed to the control unit 42 for controlling the adjustment parameters $P_A$. Also the information about a power metric or characteristic of the system, including a power metric of the illumination unit 30, of the imaging device 20 and of the processing unit 40 can be put down in the control unit 42. Furthermore, the control unit 42 comprises a predefined correlation 42a which correlates the quality related to the eye tracking, the power consumption and the adjustment parameters $P_A$, preferably in dependence of the situation parameters $P_S$. This correlation 42a can be provided in the form of a look-up table, mathematical formula, model, optimisation algorithm or function, which prescribes the controlling of the adjustment parameters $P_A$ for each given situation and for the set condition 44. So first of all, the adjustment parameters $P_A$ are controlled such that the set condition 44 is fulfilled. If the condition 44 was set with respect to the power consumption for example, the control unit 42 controls the adjustment parameters $P_A$ according to the correlation 42a such that the condition 44 is fulfilled and at the same time the achieved quality is as good as possible. Thereby the control unit 42 controls the adjustment parameters $P_A$ according to the correlation 42a preferably in dependence of at least one of the acquired situation parameters $P_S$. The same applies if a condition 44 was set with regard to the image quality.

The correlation 42a is provided on the basis of the following findings with regard to how the adjustment parameters $P_A$ of the components influence power consumption and the quality related to eye tracking as well as with regard to how different situations also influence quality and how this influence can be used to adapt the eye tracking device 10 to different situations and making it thus possible that the power consumption can be lowered while guaranteeing a minimum quality or that the quality can be maximized under a given power consumption constraint.

All three main components of an eye tracking device 10, the imaging device 20, the illumination unit 30 and the processing unit 40, consume energy. The power consumed by the illumination source(s) is prominent with respect to the other components. The energy consumed by the illumination source depends on its input power (intensity, measurable in Watt), which controls the intensity 30a of the light therefore emitted.

For pulsed illumination, the energy consumed by the illumination sources over a time window, for example per second, also depends on the duration of off and on periods (squared wave), and more in general on the power curve shape and its integral over time. Therefore, for pulsed illumination power consumption can be mainly controlled in adjusting the intensity of the pulse, adjusting the pulse duration 30c, adjusting the operating frequency 30b, in particular that of the illumination sources as well as that of the whole eye tracking device 10, and adjusting the number of light sources 30d activated, if the illumination unit 30 comprises more than one light source.

It is important to notice that not all the power consumed by the light sources is transformed in light, which is illustrated in FIG. 2. Therein the share of input power transformed in light by the illumination source (efficiency $\eta$) is shown for different values of input power. As can be seen, the efficiency $\eta$ varies with the input power. The efficiency values $\eta$ are normalized with respect to the efficiency $\eta$ at 100 mA input current I. The chart shows, at constant electrical potential, the amount of input current I, which is proportional to the input power. Therefore, the intensity of the pulse is preferably controlled, when possible, to operate at maximum efficiency $\eta$, because then most of the input power is transformed in light energy. Such a power metric can be contained in the predefined correlation 42a correlating the adjustment parameters $P_A$ to the quality and the power consumption to take account for such eye tracking device 10 specific properties of efficiency $\eta$.

Additionally, choosing to use a simplified algorithm 40a might reduce the power consumption of the processing unit 40.

Now the main aspects of input image quality are described, in particular, how image quality 62 is influenced by the adjustment parameters $P_A$ and situation parameters $P_S$. Image quality 62 might be measured under several aspects, some of which strongly correlated, which are especially the signal to noise ratio 62d and light collection by the camera, motion blur and eye tracking specific aspects.

Regarding signal to noise ratio 62d, if saturation effects are kept under control, a general rule is that the more, particularly focused, light the imaging device 20 is able to collect, the better will be its output image 60. One quick explanation for this is that given an approximately fixed amount of electric noise, the amount of signal collected by the device will be higher, and consequently its signal to noise ratio 62d. A low signal to noise ratio 62d for example causes corrupted edge features in the image 60, leading to worse estimation of eye feature positions and therefore worse gaze estimates. If the noise level becomes comparable to the contrast 62a between eye features, like pupil, iris, sclera, etc., these eye features might become impossible or difficult to detect.

Furthermore, the amount of light collected by the camera depends on the exposure time-window duration 20a, on the optics aperture 20d, on the amount of light present in the environment 64a and on the amount of light emitted by the illumination source(s) 30a during the exposure time-window 20a and reflected by the objects/persons in the scene in front of the camera, i.e. the capturing area. To be more specific, if the imaging device 20 mounts or incorporates band pass filters, e.g. infrared filter or colour filters, and because of the different wave-length responsiveness of its image sensor, not all of the environment and illumination source light hitting the camera will contribute to the creation of the image 60, and in particular waves with specific wave lengths will be mainly discarded. Finally, the imaging device 20 might also allow setting an electric gain 20b, which increases the sensitivity of the sensor at the cost of increased electric noise and camera power consumption.

With regard to motion blur, if movement happens during the exposition time-window 20a, the image 60 will present, in general, undesirable motion blur. This motion blur is proportional to the movement speed and to the time-window duration 20a. The movement might concern both the user and its eye and the device itself.

With regard to the eye tracking specific aspects, the contrast 62a in the image 60 has a dominant influence on the tracking quality, especially the contrast 62a between pupil and iris, between iris and sclera, and in general among all eye components and their surroundings, the contrast 62a between glints, namely the light reflections of the illumination sources on the eyes, and surrounding, the amount of saturation 62c of the glints, the size 62b of the glints and the contrast 62a and amount of saturation 62c of other potentially useful information, like face features for user tracking. The higher the contrast 62a, the more robustly, accurately and precisely these features can be reconstructed and the better the tracking quality.

To sum up, besides changing the illumination pulse shape 30a, 30b, 30c, another option available to control the amount of light collected by the imaging device 20 is to increase the shutter time 20a and/or aperture 20d. The downside is that the camera properties have other side effects that can affect the quality 62 of the image 60. Increasing the shutter time 20a increases motion blur and increasing the aperture size 20d can have a negative effect on the sharpness of the image 60.

The invention facilitates to keep a balance between saving energy while guaranteeing a desired minimum image and/or gaze tracking quality. The method optimizes the image quality 62, in particular concerning the eye regions. For achieving this, the following pipeline can be performed while capturing frames. First of all, the image 60 captured by the camera is analyzed to find the approximate position of the eyes of the user. Then the image quality characteristics, especially image features, which lead to the image quality parameters $P_Q$, are computed, which depend on the image region where the eyes are found. Image quality characteristics may be for example the image contrast 62a, as a better contrast 62a especially between pupil and iris and between iris and sclera, and in general among all eye components and their surroundings, enhances the accuracy and precision of the eye detection. A further image quality characteristic is the image noise, in particular the signal to noise ratio 62d. Typically, the image noise is proportionally lower if more light is captured by the camera. Therefore the ratio 62d between image data and noise can be reduced by emitting longer or more intense light, namely increase the illumination duration 20c and illumination intensity 30a, from the illumination unit 30, increasing the shutter time 20a or the aperture size 20d with the downside of increasing power consumption, motion blur or less depth of focus. A further characteristic may be the saturation 62c. If the image 60 is oversaturated in the eye regions, it looses valuable information about the actual eye shape. Another quality characteristic can be seen in colour distortions, which are only relevant for visible light RGB cameras. Different light conditions lead to different appearance of colours in the image. Especially if the colour of skin 64c is used for detecting faces or eyes, the colour appearance may be optimized by adjusting the lighting conditions.

After the image is analysed and one or more of the above named image features or image quality characteristics is extracted, the eye tracking device 10 decides, whether the image quality is sufficient for the desired eye tracking quality and depending on this send a feedback to the control unit 42 in order to adjust its settings and regulate the used energy for the next frames. The decision can also include to control light sources separately, e.g. in order to align the brightness of all glints in the image 60.

If for example a condition 44 is set with respect to the image or eye tracking quality, e.g. for power saving purpose, so that the quality has to exceed a predetermined minimum value but must not exceed a predetermined maximum quality value, then power saving can be achieved while ensuring a minimum desired quality. Saving power in this case while doing eye tracking can be achieved by decreasing the amount of consumed power by the light sources as much as possible, such that a specified minimum image or gaze quality is maintained. The image quality 62 can be derived from one or more of the above named image features. So the control unit 42 can control the adjustment parameters $P_A$ in a closed loop control, wherein the image quality 62 is persistently derived from the captured images 60 and fed back to the control loop and the control unit 42 controls on the basis of the predetermined correlation 42a the adjustment parameters $P_A$, e.g. the intensity 30a, so that the image quality 62 fulfils the set condition 44.

If in another case the condition 44 for the image or eye tracking quality is set to be maximum, e.g. if the eye tracking device 10 detects that it is plugged to the electricity grid, so that power consumption does not play any role, the best quality for precise eye detection can be achieved by optimizing the quality of the image 60 in regions where eyes are detected regardless of the consumed power. The goal is to optimize the image 60 such that the reconstruction of the (3D) eye position and (3D) gaze direction is as precise as possible. Usually this involves maximizing the contrast 62a of the pupil and iris and adjusting the overall brightness 62e for a minimum of image noise 62d.

Another possibility to influence the eye tracking quality is to adjust the brightness of glints 62e. The face and eyes of the user are not always evenly illuminated. For instance, if the light sources emit a different amount of light or if light sources are directed, then depending on the position of the face in the light cone and further individual characteristics, the light distribution in the image 60 may be uneven. It may also happen that several glints in one eye have a different brightness level 62e. For detection and reconstruction of eyes it might be useful to equalize the brightness 62e of the glints or of the light distribution in the image 60. In this case, the power of the light sources can be controlled individually for each light source to achieve this equalization. Thereby, the quality can be increased without necessarily consuming more power, because the light output needs not to be increased but is only redistributed. On the other hand, thereby also power can be saved, e.g. if a condition 44 is set with respect to the quality. Then the redistribution of the light output can be accompanied by a reduction of light intensity 30a, because the reduction in image quality 62 caused by the reduction of light intensity 30 can be compensated by the increase of image quality 62 provided by the optimization of the brightness 62e of glints. So, this described procedure can also be implemented in the control strategy of the control unit 42 for adjusting the adjustment parameters $P_A$.

Furthermore, the eye-gaze output quality or tracking quality also depends on other parameters different from the image quality 62. Eye-gaze output quality might be measured under several points of view. On the one hand, the accuracy measures how closely the reconstructed gaze matches the real observation direction of the user (eye) and on the other hand the precision measures repeatability, which means that it's a measure for, given the same or similar input condition, how consistent the output result is, or again how much noise is present in the output for a constant input.

The tracking quality is considered to be better if the tracking output, e.g. the calculated eye position or gaze direction, is updated at a higher frequency. At constant accuracy and precision, a eye tracking device 10 providing eye-gaze updates at 60 Hz performs better than one working at 30 or 20 Hz.

Under some circumstances it also might be acceptable to operate with sporadic sample rejections 40d, which might be caused for example from blurred images in case of excessive exposure time-window 20a for a moving target. So if a captured image 60 does not fulfill a predetermined minimum quality criteria the image 60 can be rejected from further being used to calculate the eye features, like position or gaze direction.

Finally, also part of the output quality is the delay, at which results are provided, i.e. how long it takes before a change in the eye features, like eye position or gaze direction, is reported in output.

Accuracy and precision might be further broken down, for example in precision separately for x (horizontal) and y (vertical) coordinate of a screen, the user is looking at. Finally, accuracy and precision might be different for different region of the 3D environment, and in particular of the device screen. For example, gaze results might be estimated to be better for the centre region of the screen and lower for its peripheral part. Several factors contribute to this effect, e.g. for some eye positions in the image 60 glints might be overlapping with part of the pupil edge, causing loss of useful information for reconstructing the eye ball position and orientation.

According to another embodiment of the invention, also a device, in which the eye tracking device 10 is integrated, like a mobile phone, a tablet, a computer, a head mounted display, can be controlled in dependence of the tracking quality, in particular an application currently running on the device while eye tracking can be controlled.

To allow for a control of an application in dependency on the tracking quality, the gaze data can be outputted together with a gaze quality or estimated tracking quality. Thereby, the eye tracking software reconstructs from the captured image 60 the eye and/or the gaze direction together with an assumed quality score of the reconstructed eye and/or gaze direction. The quality score could be the expected accuracy or precision of the computed point-of-regard on a screen. The application can make use of this score e.g. by adapting its content. The eye tracking device 10 might also return or output an expected gaze quality for different regions of the 3D environment and in particular for different regions of the screen.

Based on the accuracy score, e.g. the size of a choice area, like a graphical button, on the screen can be adjusted in order to ensure that it is easily possible to input a choice via eye-gaze. Based on the expected accuracy per screen region, the application choose to show its choice areas (buttons) in a region of the screen where the expected gaze quality is higher.

Furthermore the eye tracking device 10 can be controlled such to produce a gaze quality requested by an application. The application may request a minimum quality of the reconstructed gaze, e.g. the accuracy of the gaze direction has to be 1.5° or better. The eye tracking device 10 can use this information to control the components of the eye tracking device 10 to achieve this goal and to save as much power as possible.

For example a quality condition can be set in dependence of an aapplication. Some applications such as 3D shooter games and artist software require high accuracy. Other software like puzzle games, or applications which support gaze-based scrolling have lower accuracy requirements concerning the eye tracking device 10, and therefore allows it to run in a low power mode. This invention will allow setting an accuracy requirement and use that to adjust the image quality 62 and therefore the final gaze quality.

A further example is that applications may want to adjust the needed quality based on their current state or external events. The quality can be adjusted due based on the user's activity 64d such as looking on a specific region on the screen, reading a text, looking at an image or video, using the gaze for painting or others.

Also the energy availability could be used to decide, which conditions 44 for the quality or power consumption are set. For example, when a device is plugged in, power consumption becomes a less relevant issue and the eye tracking device 10 focus can shift on maintaining the best output quality. However, when powered by battery the eye tracking device 10 might contribute to increase the battery life, at least until next recharge, by selecting a compromise between eye tracking quality and power consumption, in particular by setting a power consumption constraint, like a maximum consumption value, that the power consumption has to fall below.

If a desired tracking quality shall be achieved or the current tracking quality shall be outputted, the tracking quality must be estimated, which can be done on the basis of the above named influencing factors. As already described, the quality of the reconstructed eye and gaze is strongly related to the quality 62 of the acquired eye image 60. The technique has to map the image quality 62, e.g. contrast 62a, brightness 62e, etc., to an expected eye tracking quality. Once this map is defined, the eye tracking device 10 can compute an eye tracking quality while doing eye tracking.

The correlation mapping the image quality 62 to the eye tracking quality could for example be recorded and stored once when calibrating the device. A group of people may be asked to fixate a number of points on the screen, whose positions are known to the eye tracking device 10. Over some seconds, the eye tracking device 10 adjusts different camera and LED properties, like gain value 20b, light intensity 30a, shutter speed 20a, etc. It analyzes the quality 62 of the captured images 60, reconstructs the eyes, the gaze direction, computes a point-of-regard on the screen and measures the error in accuracy or precision of the reconstruction. These values are saved into a data structure which then defines a correlation between image quality 62 and eye tracking quality.

Furthermore, if the application is giving a desired eye tracking quality, a similar method can be used. The generated map from above which relates image quality 62 to eye tracking quality can be used to translate the desired eye tracking quality into a desired image quality 62. While doing eye tracking, the eye tracking device 10 adjusts the adjustment parameters $P_A$ to achieve the given image quality 62.

This image-to-gaze quality-mapping might be further extended by breaking down the quality measures into different regions of the screen.

Input quality needs usually go in opposite direction with power consumption reduction needs. As mentioned before, the best image quality is collected when as much light energy as possible is collected (to increase the signal/noise ratio 62d) in the shortest period possible, to prevent motion blur. For ideal image quality conditions, the illumination source should provide in the shortest time interval possible the light energy to create the image 60. Furthermore best output quality is obtained when the eye-gaze update frequency is set to maximum achievable by the eye tracking device 10 while preserving the maximum sample quality. The eye tracking device 10 can obtain power saving when these mentioned constraints are loosened, especially as explained in the following.

As mentioned, different situations have different impact on the tracking quality. So specifying these situations makes it possible to achieve an increase in tracking quality, or on the other hand, for the same tracking quality to achieve a reduction in power consumption. In particular the adaption possibilities adaptation to environment light, adaptation to environment dynamicity, adaptation to application needs, adaptation to user characteristics, and a variable eye tracking device mode for low power fixation tracking are now explained as examples in detail.

It has to be noted, that "environment light" denotes the part (wavelength spectrum) of light present in the environment for which the imaging device 20 inclusive its (optional) filters is sensitive, especially considered for the sensitivity percentage at each wavelength.

Environment light might contribute in creating the input image 60, in particular for collecting the necessary light to have a good contrast 62a among eye features. The illumination source(s) must anyway provide enough light to create the glint(s) in the eyes necessary for 3D position reconstruction. Coarsely the environment light condition 64a and the eye tracking device 10 strategy can be resumed as follow:

Strong environment light: The eye tracking device 10 must target avoiding image saturation 62c, therefore reducing the exposure time-window 20a of the imaging device 20. All light needed for creating the necessary eye features contrast 62a might be collected from the environment, and the illumination source(s) must only emit the light power necessary to create glint(s) in the visible eye(s) of the user(s). The illumination pulse must be concentrated in the exposure time window 20a.

Intermediate environment light: The eye tracking device 10 may extend the exposure time 20a as long as possible to collect as much environment light as possible (or as needed). "As long as possible" is to be intended in a compatible way with the blur constraints, as explained before: In a static environment and/or when it is considered acceptable to lower the quality of the output in term of higher rejected samples 40d and/or when saccadic eye movements 64d might be rejected, exposure time-window 20a might be extended to different degrees. During the exposure time-window 20a the illumination source(s) must emit the light power necessary to create glint(s) in the visible eye(s) of the user(s) and provide, if needed, the necessary remaining share of light to obtain the necessary eye features contrast 62a. This light energy must be emitted during the exposure time-window 20a of the camera, and the wave shape 30a, 30b, 30c, that is the power curve shape, might be optimized to work at maximum energy conversion efficiency η.

Absent or negligible environment light: The illumination source must provide all the necessary light to create the necessary contrast 62a among eye features, and preferably to create glints on the eye. If, as explained in the previous point, the exposure time-window 20a might be extended, the illumination source adapts its wave shape 30a, 30b, 30c to work at maximum energy conversion efficiency.

Additionally, the eye tracking device 10 might operate with at least two different imaging devices 20 (cameras), at least two with different wave filter/sensor sensitivity setup. In particular, at least one camera might be setup to be sensible to a wider range of light wavelengths, and collect more environment light to obtain the necessary contrast 62a among eye-features, and at least one camera might be setup to be sensible to a narrower range of light wavelengths, (approximately) centered on the light-wave band at which the illumination source operates, and collect the light necessary to obtain glint information. The at least two different cameras might be placed close to each other, to allow an easier information matching, or further apart, then using a geometric transformation function to map features among the two image domains.

With regard to adaptation to environment dynamicity, as anticipated in the previous paragraphs, the eye tracking device 10 might reduce power consumption by extending exposure time-window 20a and optimizing the illumination pulse shape 30a, 30b, 30c. In this context, the eye tracking device 10 detects or receives information about the environment dynamicity 64, especially given by the movement 64d of the user or his eyes and/or the movement 64d of the eye tracking device 10 itself, and sets the adjustment parameters $P_A$ to reduce the power inputted to the illumination source(s).

With regard to adaptation to application needs, as mentioned before, the requirement in term of eye tracking device output quality might vary depending on the current application in use. These quality requirements might regard one or more among accuracy, precision, delay, update frequency, etc. The eye tracking device 10 might receive an explicit eye-gaze quality request 50, and lower its power consumption to just achieve the quality required. The input 50 to the eye tracking device 10 might also be in term of application scope, like "reading with automatic scrolling", and the eye tracking device 10 lowers its power consumption to just achieve the quality required to perform correctly the operation in act. For this specific example, accuracy in the screen y-coordinate (vertical) is to be considered more important that in the x-coordinate (horizontal), sporadic rejected samples are unimportant, and update frequency (eye tracking device 10 frequency) might be lowered.

With regard to adaptation to user characteristics, different user characteristics allow obtaining same image input quality 62 with different light power emission. For example, brown-eye people present a higher contrast 62a between pupil and iris in the infrared domain, as opposed to the visible domain. By detecting the reflectivity characteristics of the user eye 64b, the eye tracking device 10 adapts the amount of energy light emitted to obtain the desired minimum eye-feature contrast 62a.

In the same way, interfering surfaces like glasses 64e might reduce the amount of light reflected by the visible user(s) eye(s). When the eye tracking device 10 detects that the user is not wearing glasses 64e, the eye tracking device 10 reduces the amount of energy light emitted to obtain the desired minimum eye-feature contrast 62a.

Reprising the eye tracking device 10 mentioned with at least two different cameras, the eye tracking device 10 might decide to use the camera that allows the best eye feature extraction for the user(s) present in the scene, or a combination of the information contained in the images 60 coming from the two cameras.

With regard to variable eye tracking device 10 mode for low power fixation tracking, several eye movement behaviours 64d exist, of which the most important are fixations and saccades. During a fixation the attention of the user is concentrated on one point, and the eye produce reduced or negligible movement. During a saccade the eye gaze rapidly moves from one point to another. For a majority of applications only fixation points are important, which makes transitions from an old to a new fixation the key period to detect the beginning of a new fixation. The eye tracking device 10 might continuously change its operation mode, reducing frequency 30b and emitted light, and therefore saving power, after a fixation is detected and during its duration, and increasing them again when a transition is detected to then be able to detect the next fixation with a reduced delay. Coarsely, most of the time eyes are in "fixation mode" (visual intake does not happen when the eye performs a saccade, making ourselves effectively blind for a short period), therefore the eye tracking device 10 by adopting this technique is able to operate at lower frequency 30b for most of the operation period. To be complete, this does not apply in every situation, e.g. when the user is reading fixation duration might be even shorter then the update period of the eye tracking device 10, so that the eye tracking device 10 might detect the eye to be in continuous movement. However, as mentioned before, reading is a user behaviour that might be handled in a different way in term of energy consumption.

To conclude, by the presented method or operating an eye tracking device and its embodiments according to the invention, advantageously, eye tracking can be provided at a desired quality but with reduced power consumption and flexibly adapted to many different situations.

The invention claimed is:

1. A method comprising:
    capturing, using an eye tracking device, one or more first images of an eye of a user, on the basis of which the eye tracking device performs eye tracking while at least two adjustment parameters of the eye tracking device are set to a first combination of values based on a first condition with respect to one of an eye tracking accuracy of the eye tracking device or a power consumption of the eye tracking device, wherein if the first condition is with respect to the eye tracking accuracy, the first condition indicates a minimum eye tracking accuracy that the eye tracking accuracy is to exceed and wherein if the first condition is with respect to the power consumption, the first condition indicates a maximum consumption value that the power consumption is to fall below;
    determining a second condition with respect to the other of the eye tracking accuracy or the power consumption;
    determining, according to a predefined correlation between (1) the at least two adjustment parameters and (2) the eye tracking accuracy and the power consumption, a plurality of second combinations of values for the at least two adjustment parameters such that, when the at least two adjustment parameters are set to any one of the plurality of second combinations of values, the eye tracking device fulfils the second condition when performing eye tracking;
    selecting one of the plurality of second combinations of values based on the one of the eye tracking accuracy or the power consumption;
    changing the at least two adjustment parameters to the one of the plurality of second combinations of values; and
    capturing, using the eye tracking device, one or more second images of the eye of the user, on the basis of which the eye tracking device performs eye tracking while the at least two adjustment parameters are set to the one of the plurality of second combinations of values.

2. The method of claim 1, wherein the second condition indicates a minimum eye tracking accuracy and the one of the plurality of second combinations of values is selected to minimize power consumption.

3. The method of claim 1, wherein the second condition indicates a maximum power consumption and the one of the plurality of second combinations of values is selected to maximize eye tracking accuracy.

4. The method of claim 1, wherein the at least two adjustment parameters includes at least one of:
    a parameter indicative of a light intensity of a light source of an illumination component of the eye tracking device;
    a parameter indicative of an illumination duration of a light source of an illumination component the eye tracking device;
    a parameter indicative of an illumination frequency of a light source of an illumination component of the eye tracking device; or
    a parameter indicative of a number of active light sources of an illumination component of the eye tracking device.

5. The method of claim 1, wherein the at least two adjustment parameters includes at least one of:
    a parameter indicative of an electric gain of a camera of a capturing component of the eye tracking device;
    a parameter indicative of an update frequency of a camera of a capturing component of the eye tracking device;
    a parameter indicative of an aperture size of a camera of a capturing component of the eye tracking device;
    a parameter indicative of a shutter speed of a camera of a capturing component of the eye tracking device;
    a parameter indicative of a sampling rate of a camera of a capturing component of the eye tracking device; or
    a parameter indicative of a number of cameras of a capturing component of the eye tracking device.

6. The method of claim 1, wherein the at least two adjustment parameters includes at least one of:
    a parameter indicative of an eye tracking algorithm executed by a processor of a processing component of the eye tracking device;
    a parameter indicative of clock frequency of a processor of a processing component of the eye tracking device; or
    a parameter indicative of a number of active processors of a processing component of the eye tracking device.

7. The method of claim 1, further comprising receiving a selection input indicative of the at least two adjustment parameters out of three or more adjustment parameters of components of the eye tracking device.

8. The method of claim 1, further comprising:
determining a situation parameter indicative of an environmental light intensity, a user behavior, or a user biometric; and
determining the predefined correlation based on the situation parameter.

9. The method of claim 8, wherein determining the situation parameter includes capturing an image with a capturing component of the eye tracking device and determining the situation parameter based on the image.

10. The method of claim 8, wherein determining the situation parameter includes determining an application executed by a processing component of the eye tracking device and determining the situation parameter based on the application.

11. The method of claim 8, wherein the at least two adjustment parameters are selected, based on the situation parameter, out of three or more adjustment parameters of components of the eye tracking device.

12. An eye tracking device comprising:
an illumination component including one or more light sources to emit light onto the eye of a user;
a capturing component including one or more cameras to capture images of the eye of the user;
a processing component including one or more processors to:
on the basis of one or more first images captured by the capturing component, performing eye tracking while at least two adjustment parameters of the eye tracking device are set to a first combination of values
based on a first condition with respect to one of an eye tracking accuracy of the eye tracking device or a power consumption of the eye tracking device, wherein if the first condition is with respect to the eye tracking accuracy, the first condition indicates a minimum eye tracking accuracy that the eye tracking accuracy is to exceed and wherein if the first condition is with respect to the power consumption, the first condition indicates a maximum consumption value that the power consumption is to fall below;
determining a second condition with respect to the other of the eye tracking accuracy or the power consumption;
determining, according to a predefined correlation between (1) the at least two adjustment parameters and (2) the eye tracking accuracy and the power consumption, a plurality of second combinations of values for the at least two adjustment parameters such that, when the at least two adjustment parameters are set to any one of the plurality of second combinations of values, the eye tracking device fulfils the second condition when performing eye tracking;
select one of the plurality of second combinations of values based on the one of the eye tracking accuracy or the power consumption;
changing the at least two adjustment parameters to the one of the plurality of second combinations of values; and
on the basis of one or more second images captured by the capturing component, performing eye tracking while the at least two adjustment parameters are set to the one of the plurality of second combinations of values.

13. The eye tracking device of claim 12, wherein the second condition indicates a minimum eye tracking accuracy and the one of the plurality of second combinations of values is selected to minimize power consumption.

14. The eye tracking device of claim 12, wherein the second condition indicates a maximum power consumption and the one of the plurality of second combinations of values is selected to maximize eye tracking accuracy.

15. The eye tracking device of claim 12, wherein the at least two adjustment parameters includes at least one adjustment parameter of the illumination component.

16. The eye tracking device of claim 12, wherein the at least two adjustment parameters includes at least one adjustment parameter of the capturing component.

17. The eye tracking device of claim 12, wherein the at least two adjustment parameters includes at least one adjustment parameter of the processing component.

18. The eye tracking device of claim 12, wherein the processing component is further to:
determine a situation parameter indicative of an environmental light intensity, a user behavior, or a user biometric; and
determine the predefined correlation based on the situation parameter.

19. The eye tracking device of claim 18, wherein the processing component is to determine the situation parameter based on an image captured by the capturing component or based on an application executed by the processing component.

20. The non-transitory computer-readable medium including instructions which, when executed by one or more processing units of an eye tracking device, cause the eye tracking device to perform operations comprising:
capturing, using an eye tracking device, one or more first images of an eye of a user, on the basis of which the eye tracking device performs eye tracking while at least two adjustment parameters of the eye tracking device are set to a first combination of values
based on a first condition with respect to one of an eye tracking accuracy of the eye tracking device or a power consumption of the eye tracking device, wherein if the first condition is with respect to the eye tracking accuracy, the first condition indicates a minimum eye tracking accuracy that the eye tracking accuracy is to exceed and wherein if the first condition is with respect to the power consumption, the first condition indicates a maximum consumption value that the power consumption is to fall below;
determining a second condition with respect to the other of the eye tracking accuracy or the power consumption;
determining, according to a predefined correlation between (1) the at least two adjustment parameters and (2) the eye tracking accuracy and the power consumption, a plurality of second combinations of values for the at least two adjustment parameters such that, when the at least two adjustment parameters are set to any one of the plurality of second combinations of values, the eye tracking device fulfils the second condition when performing eye tracking;
selecting one of the plurality of second combinations of values based on the one of the eye tracking accuracy and the power consumption;
changing the at least two adjustment parameters to the one of the plurality of second combinations of values; and capturing, using the eye tracking device, one or more second images of the eye of the user, on the basis of which the eye tracking device performs eye tracking while the at least two adjustment parameters are set to the one of the plurality of second combinations of values.

* * * * *